United States Patent [19]

Tomisawa

[11] Patent Number: 4,512,315

[45] Date of Patent: Apr. 23, 1985

[54] ELECTRONICALLY CONTROLLED FUEL INJECTION SYSTEM FOR INTERNAL COMBUSTION ENGINE

[75] Inventor: Naoki Tomisawa, Isesaki, Japan

[73] Assignee: Japan Electronic Control Systems Company, Limited, Japan

[21] Appl. No.: 435,378

[22] Filed: Oct. 20, 1982

[30] Foreign Application Priority Data

Oct. 21, 1981 [JP] Japan ................................ 56-168361

[51] Int. Cl.³ ............................................ F02M 51/02
[52] U.S. Cl. .................................................... 123/478
[58] Field of Search ................ 123/478, 480, 486, 487

[56] References Cited

U.S. PATENT DOCUMENTS

| 4,250,858 | 2/1981 | Jeenicke et al. | 123/480 |
| 4,313,412 | 2/1982 | Hosaka et al. | 123/486 X |
| 4,352,158 | 9/1982 | Date et al. | 123/492 X |
| 4,389,994 | 6/1983 | Denz et al. | 123/480 X |
| 4,470,390 | 9/1984 | Omori et al. | 123/480 X |

FOREIGN PATENT DOCUMENTS 72238   6/1981   Japan ................................... 123/478

Primary Examiner—Tony M. Argenbright
Attorney, Agent, or Firm—Lowe, King, Price & Becker

[57] ABSTRACT

An electronically-controlled fuel injection system for an internal combustion engine having a supercharger, wherein fuel is injected into each power cylinder of the engine at a rate which is controlled through detection of various operational parameters including the output speed of the engine, the temperature of the engine cooling water and the pressure of the air compressed in the air induction unit of the engine by the supercharger or turbocharger.

7 Claims, 6 Drawing Figures

ELECTRONICALLY CONTROLLED FUEL INJECTION SYSTEM FOR INTERNAL COMBUSTION ENGINE

FIELD OF THE INVENTION

The present invention relates to an electronically operated fuel injection system for an internal combustion engine of the type equipped with a supercharger or turbocharger.

BACKGROUND OF THE INVENTION

As is well known in the art, an electronically operated fuel injection system for an internal combustion engine is adapted to inject fuel into each of the power cylinders of the engine at a rate controlled through detection of various operational parameters of the engine so as to produce in each power cylinder a combustible mixture having a properly controlled air-to-fuel ratio. Such a fuel injection system consists essentially of a solenoid-operated fuel injection valve, sensors to detect such operational parameters and a control circuit adapted to produce signal pulses having pulsewidths varied in accordance with the detected operational parameters of the engine.

One of the operational parameters thus detected in an electronically operated fuel injection system is the rate at which air is to be inducted into each of the power cylinders of the engine. In a prior-art electronically operated fuel injection system, the air induction rate is calculated on the basis of the output speed of the engine and the degree of opening of the throttle valve provided in the air induction unit of the engine. If the engine using such a fuel injection system is of the type equipped with a supercharger to "blow" air into the power cylinders, the air induction rate thus calculated is not in conformity to the actual air induction rate. This makes it impossible to properly control the air-to-fuel ratio of the mixture to be combusted in each of the power cylinders. The present invention contemplates provision of an improved fuel injection system eliminating such a problem encountered in a conventional electronically operated fuel injection system.

SUMMARY OF THE INVENTION

In accordance with the present invention, there is provided an electronically operated fuel injection system for an internal combustion engine including an air induction unit having a throttle valve and supercharging means to force the air to be inducted through the air induction unit into each of the power cylinders of the engine, comprising an engine-speed pulse generator responsive to the output speed of the engine and operative to produce engine-speed pulses representative of the detected engine output speed; a throttle opening sensor responsive to the degree of opening of the throttle valve and operative to produce a voltage signal representative of the detected throttle valve opening degree; a basic injection-rate pulse generator responsive to the output signal from the throttle opening sensor and operative to produce basic injection-rate pulses indicative of a basic fuel injection rate optimum for the detected engine output speed and the air induction rate calculated on the basis of the detected throttle valve opening degree; an air-pressure sensor responsive to the pressure of air compressed by the supercharging means upstream of the throttle valve in the air induction unit and operative to produce a voltage signal representative of the detected air pressure; a first injection-rate pulse generator responsive to the basic injection-rate pulses and the voltage signal from the air-pressure sensor and operative to produce primarily corrected injection-rate pulses indicative of a fuel injection rate corrected in accordance with the voltage signal from the air-pressure sensor; a second corrected injection-rate pulse generator responsive to signals representative of a plurality of operational parameters and operative to produce secondarily corrected injection-rate pulses indicative of a fuel injection rate corrected in accordance with the operational parameters; and a fuel injection valve responsive to the secondarily corrected injection-rate pulses from the second corrected injection-rate pulse generator and operative to inject fuel into each of the power cylinders of the engine at the fuel injection rate represented by the secondarily corrected injection-rate pulses. If desired, the first corrected injection-rate pulse generator may be constructed and arranged to be responsive to not only the pulses from the basic injection-rate pulse generator and the signal from the air-pressure sensor but also to the pulses from the engine-speed pulse generator.

BRIEF DESCRIPTION OF THE DRAWINGS

The drawbacks of a prior-art electronically operated fuel injection system and the features and advantages of an electronically operated fuel injection system according to the present invention will be more clearly understood from the following description taken in conjunction with the accompanying drawings in which like reference numerals designate similar or corresponding units and in which.

DETAILED DESCRIPTION OF THE PRIOR ART

Figure 1:
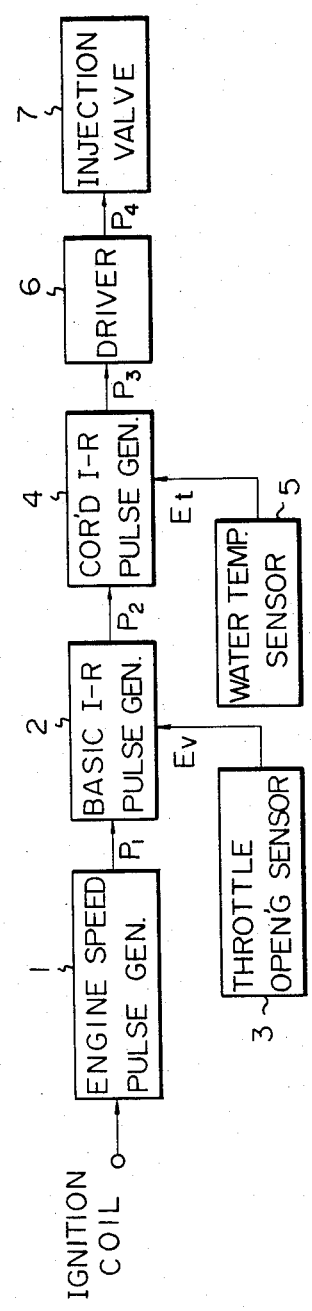
FIG. 1 is a block diagram showing an example of a prior-art electronically operated fuel injection system for an automotive internal combustion engine.
Figure 2:
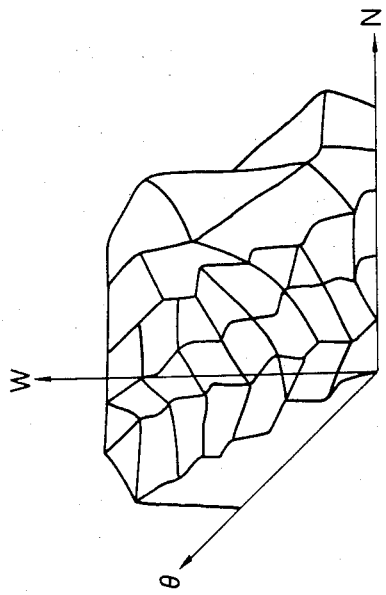
FIG. 2 is a graph showing an example of the relationship among detected operational parameters and the pulsewidths of the pulses to be varied in accordance with the operational parameters in the prior-art fuel injection system shown in FIG. 1.

Referring to FIG. 1 of the drawings, a prior-art electronically operated fuel injection system comprises an engine-speed pulse generator 1 connected to the primary winding of the ignition coil of a spark ignition system of an internal combustion engine. The engine-speed pulse generator 1 is thus supplied with signal currents synchronized with the revolutions of the camshaft (not shown) of the engine and produces engine-speed pulses $P_1$ which are synchronized with the rotation of the output shaft (not shown) of the engine. The engine-speed pulses $P_1$ are fed to a basic injection-rate pulse generator 2 having two input terminals one of which is connected to the output terminal of the engine-speed pulse generator 1 and the other of which is connected to an output terminal of a throttle opening sensor 3. The throttle opening sensor 3 is adapted to detect the angular position of the throttle valve (not shown) provided in the air induction unit of the internal combustion engine and to produce a voltage signal $E_v$ variable with the detected degree of opening of the throttle valve. The flow rate of air through the air induction unit of an internal combustion engine can be calculated on the basis of the detected output speed of the engine and the detected degree of opening of the throttle valve as is well known in the art. The voltage signal $E_v$ delivered from the throttle opening sensor 3 is for this reason indicative of the rate at which fresh air is supplied to the individual power cylinders (not shown) of the engine. The basic injection-rate pulse generator 2 is thus operative to produce basic injection-rate pulses $P_2$ indicative of a basic fuel injection rate optimum for the detected output speed and air induction rate of the engine. The basic injection-rate pulses $P_2$ indicative of such a basic fuel injection rate have pulsewidths W which are determined in relation to the detected output speed (N) of the engine and the detected degree of opening ($\theta$) of the throttle valve. The relationship among these three parameters W, N and $\theta$ is such as that shown in FIG. 2 and is stored in the form of a table of data in the basic injection-rate pulse generator 2. The basic injection-rate pulse generator 2 has an output terminal connected to a corrected injection-rate pulse generator 4 to which voltage signals representative of various operational parameters are to be supplied. One such parameter is the temperature of the cooling water circulated through the water jackets (not shown) formed in the cylinder block and head of the engine. Thus, the corrected injection-rate pulse generator 4 has input terminals respectively connected to sensors including a water temperature sensor 5 adapted to detect the temperature of the engine cooling water and to produce a voltage signal $E_t$ variable with the detected engine cooling water temperature. The basic injection-rate pulses $P_2$ delivered from the basic injection-rate pulse generator 2 are corrected in pulsewidth in accordance with the voltage signals thus supplied from the sensors including the water temperature sensor 5. The corrected injection-rate pulse generator 4 produces corrected injection-rate pulses $P_3$ indicative of the corrected rate at which fuel is to be injected into each of the power cylinders of the engine. The corrected injection-rate pulse generator 4 has an output terminal connected through a driver circuit 6 to a solenoid coil of a solenoid-operated fuel injection valve 7.

While the air induction rate of the engine is calculated from the detected output speed of the engine and the detected degree of opening of the throttle valve in the above described prior-art fuel injection system, there are cases where the air induction rate can not be determined on the basis of these two parameters alone. One of such cases arises in a recent automotive internal combustion engine of the type equipped with a supercharger. If the air induction rate is determined simply on the basis of the output speed of the engine and the degree of opening of the throttle valve in such an internal combustion engine in which air is forced into each of the power cylinders, the calculated air induction rate becomes lower than the actual air induction rate with the result that the air-to-fuel ratio of the combustible mixture to be produced in the power cylinders can not be regulated properly. The present invention contemplates provision of an electronically operated fuel injection system eliminating such a drawback of a fuel injection system of the described type.

DESCRIPTION OF THE PREFERRED EMBODIMENTS

Figure 3:
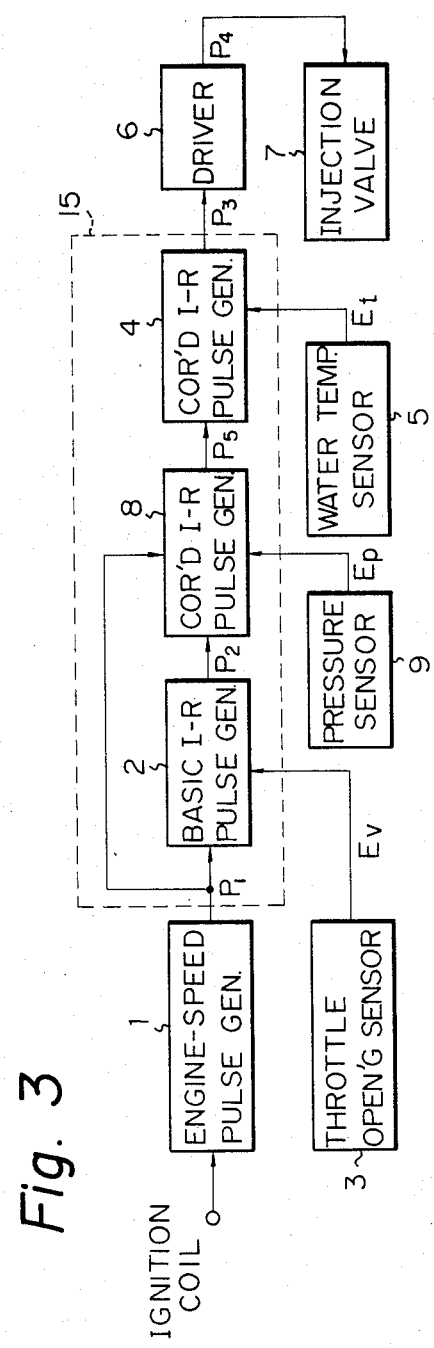
FIG. 3 is a block diagram showing a preferred embodiment of an electronically operated fuel injection system according to the present invention.

Referring to FIG. 3 of the drawings, an electronically operated fuel injection system embodying the present invention comprises an engine-speed pulse generator 1, a basic injection-rate pulse generator 2, a throttle opening sensor 3, a corrected injection-rate pulse generator 4, a water temperature sensor 5, a driver circuit 6 and a fuel injection valve 7 similarly to the prior-art fuel injection system described with reference to FIG. 1. The engine-speed pulse generator 1 is connected to the primary winding of the ignition coil of a spark ignition system (not shown) and is operative to produce engine-speed pulses $P_1$ synchronized with the rotation of the output shaft (not shown) of the engine. The engine-speed pulses $P_1$ are fed to the basic injection-rate pulse generator 2 which is operative to produce basic injection-rate pulses $P_2$ indicative of a basic fuel injection rate optimum for the engine output speed represented by the pulses $P_1$ from the engine-speed pulse generator 1 and the air induction rate calculated on the basis of the degree of opening of the throttle valve represented by the voltage signal $E_v$ from the throttle opening sensor 3. The relationship among the detected engine output speed (N), the detected degree ($\theta$) of opening and the pulsewidths (W) of the basic injection-rate pulses $P_2$ produced by the basic injection-rate pulse generator 2 may be such as that shown in FIG. 2 and may be stored in the form of a table of data in the injection-rate pulse generator 2 as in the prior-art fuel injection system described with reference to FIG. 1.

Figure 4:
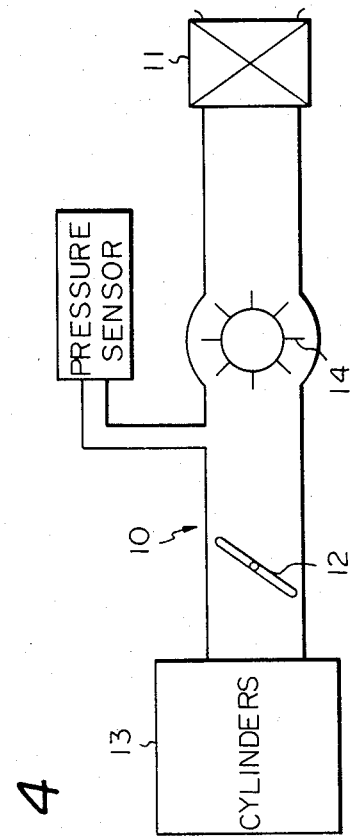
FIG. 4 is a schematic sectional view showing the arrangement of an automotive internal combustion engine including a supercharger.

In the shown embodiment of the present invention, the basic injection-rate pulse generator 2 has an output terminal connected to a first corrected injection-rate pulse generator 8 having two input terminals one of which is connected to the output terminal of the basic injection-rate pulse generator 2 and the other of which is connected to the output terminal of an air-pressure sensor 9. As shown in FIG. 4, the air-pressure sensor 9 is provided to be responsive to the pressure in the passageway in the air induction unit 10 of an internal combustion engine including an air cleaner 11, a throttle valve 12, a power cylinder assembly 13, and a supercharging compressor wheel 14. The compressor wheel 14 is provided in the air induction unit 10 between, for example, the air cleaner 11 and the throttle valve 12 and is connected to a turbine (not shown) to be driven by the exhaust gases from the cylinder assembly 13 as is well known in the art. During operation, the turbine is driven for rotation by the exhaust gases from the cylinder assembly 13 and drives the compressor wheel 14 for rotation so that the fresh air directed through the air cleaner 11 into the air induction unit 10 is compressed and is blown past the throttle valve 12 into each of the individual power cylinders of the cylinder assembly 13. The air-pressure sensor 9 detects the pressure of the air thus compressed by the compressor wheel 14 and produces a voltage signal $E_p$ representative of the detected pressure of the compressed air. The basic injection-rate pulses $P_2$ delivered from the basic injection-rate pulse generator 2 to the first injection-rate pulse generator 8 are corrected in pulsewidth in accordance with the voltage signal $E_p$ thus supplied from the air-pressure sensor 9. The first corrected injection-rate pulse generator 8 produces primarily corrected injection-rate pulses $P_5$ indicative of the corrected fuel injection rate.

The primarily corrected injection-rate pulses $P_5$ are supplied to a second corrected injection-rate pulse generator 4. The second corrected injection-rate pulse generator 4 is similar to its counterpart in the prior-art system of FIG. 1 and is thus responsive to voltage signals representative of various operational parameters including the temperatures of engine cooling water are to be supplied. The second corrected injection-rate pulse generator 4 has input terminals including an input terminal connected to the output terminal of the first injection-rate pulse generator 8 and an input terminal connected to the output terminal of a water temperature sensor 5. The water temperature sensor 5 is adapted to detect the temperature of engine cooling water and to produce a voltage signal $E_t$ representative of the detected cooling water temperature. The primarily corrected injection-rate pulses $P_5$ are thus further corrected in pulsewidth in accordance with the voltage signals supplied from the sensors including the water temperature sensor 5. The corrected injection-rate pulse generator 4 produces secondarily corrected injection-rate pulses $P_3$ indicative of the rate at which fuel is to be injected into each of the power cylinders of the engine. The second corrected injection-rate pulse generator 4 has an output terminal connected through a driver circuit 6 to an input terminal of the solenoid coil of a solenoid-operated fuel injection valve 7. The fuel injection valve 7 is thus actuated to inject fuel into each of the individual power cylinders of the cylinder assembly 13 at a rate dictated by the secondarily corrected injection-rate pulses $P_3$ delivered from the corrected injection-rate pulse generator 4.

Figure 5:
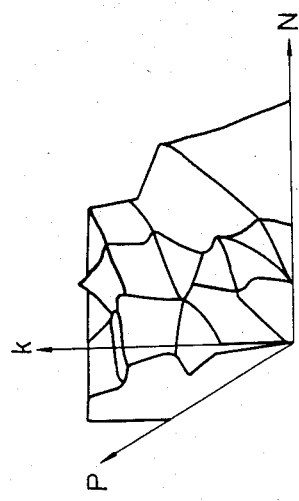
FIG. 5 is a graph showing an example of the relationship among detected operational parameters and the pulsewidths of the pulses to be varied in accordance with the operational parameters in the fuel injection system shown in FIG. 3.

The primarily corrected injection-rate pulses $P_5$ have pulsewidths W which are determined in relation to the detected pressure of air in the air induction unit. If desired, the pulsewidths of the primarily corrected injection-rate pulses $P_3$ may be determined in relation to not only the air pressure P detected by the air-pressure sensor 9 but also the detected output speed (N) of the engine. For this purpose, the first injection-rate pulse generator 8 is provided with a third input terminal connected to the output terminal of the engine-speed pulse generator 1 as shown in FIG. 3 and is constructed to be operative to calculate a correction parameter k which is determined in accordance with the detected engine output speed N and the detected air pressure P. The relationship among the engine output speed N, the air pressure P and the above mentioned correction parameter k may such as that shown in FIG. 5 and is stored in the form of a table of data in the basic injection-rate pulse generator 2.

Figure 6:
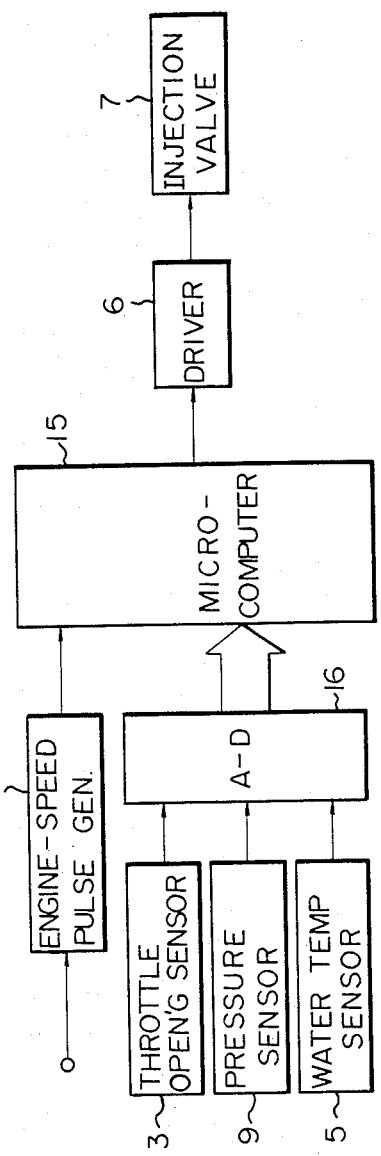
FIG. 6 is a block diagram showing a computerized version of the fuel injection system shown in FIG. 3.

The basic injection-rate pulse generator 2, first injection-rate pulse generator 8 and second corrected injection-rate pulse generator 4 of the fuel injection system hereinbefore described with reference to FIG. 3 are preferably constituted by a microcomputer 15 which is programmed to achieve the respective functions of the signal generators 2, 8 and 4. As shown in FIG. 6, such a microcomputer 15 has an input port connected to the output terminal of the engine-speed pulse generator 1 and input ports connected through an analog-to-digital converter 16 to the respective output terminals of the throttle opening sensor 3, water temperature sensor 5 and air-pressure sensor 9. The microcomputer 15 further has an output port connected through the driver circuit 6 to the solenoid coil of the fuel injection valve 7.

What is claimed is:

1. An electronically operated fuel injection system for actuating injector means provided at an air induction passage of an internal combustion engine, said induction passage being provided with a throttle valve operable to open to varying degrees and a supercharging means mounted upstream of said throttle valve, comprising:
    engine speed sensor means for producing an engine speed signal representative of the engine speed of said engine;
    throttle opening sensor means for producing a throttle opening signal representative of the opening degree of the throttle valve;
    basic injection-rate pulse generating means for producing basic injection-rate pulses indicative of a basic fuel injection rate in response to said engine speed signal and said throttle opening signal;
    air-pressure sensor means for producing an air pressure signal representative of the air pressure downstream of said supercharging means but upstream of said throttle valve;
    a corrected injection-rate pulse generating means for correcting said basic injection-rate pulses in accordance with said air-pressure signal; and
    an actuator for actuating said injector means in response to the corrected basic injection-rate pulses.

2. An electronically operated fuel injection system as set forth in claim 1, futher comprising water temperature sensor means responsive to the temperature of cooling water in the engine and operative to produce a voltage signal representative of the detected cooling water temperature, the signal from the air-pressure sensor means being supplied to said second injection-rate pulse generator as one of the signals representative of said operational parameters.

3. An electronically operated fuel injection system as set forth in claim 2, in which said basic injection-rate pulse generating means and said corrected injection-rate pulse generating means are comprised of a microcomputer having an input port connected to said engine-speed sensor means and input ports respectively connected through an analog-to-digital converter to said throttle opening sensor means, said air-pressure sensor means and said water temperature sensor.

4. An electronically operated fuel injection system as set forth in claim 1, in which said basic injection-rate pulse generating means and said corrected injection-rate pulse generating means are comprised of a microcomputer having an input port connected to said engine-speed sensor means and input ports respectively connected through an analog-to-digital converter to said throttle opening sensor means and said air-pressure sensor means.

5. An electronically operated fuel injection system as claimed in claim 1, in which said corrected injection-rate pulse generating means is adapted to be responsive both to said air-pressure signal and to said engine speed signal.

6. In an electronically controlled fuel injection system for actuating injector means at an air-induction passage of an internal combustion engine and having a supercharging means upstream of a throttle valve in the air-induction passage, a basic injection-rate pulse generating means for producing basic injection-rate pulses indicative of a basic fuel-injection rate as a function of engine speed and opening of the throttle valve, and an actuator means for actuating the injector means in response to the injection rate pulses, the improvement comprising:

pressure detecting means for detecting pressure of air compressed by the supercharging means downstream thereof and upstream of the throttle valve, and control means for controlling actuation of the injector means in accordance with the air pressure detected downstream of the supercharging means and upstream of the throttle valve.

7. The improved supercharged fuel-injection system recited in claim 6 wherein said control means comprises a corrected injection-rate pulse generating means for correcting said basic injection-rate pulses in accordance with the air pressure detected by said pressure detecting means and for providing said corrected basic injection-rate pulses to said actuator means thereby to actuate the injector means in accordance with air pressure downstream of the supercharging means and upstream of the throttle valve.

* * * * *